(12) United States Patent
Sunaga et al.

(10) Patent No.: US 7,106,527 B2
(45) Date of Patent: Sep. 12, 2006

(54) IMAGE-FORMING OPTICAL SYSTEM (75) Inventors: Toshihiro Sunaga, Kanagawa (JP); Koshi Hatakeyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/859,768

(22) Filed: Jun. 3, 2004

(65) Prior Publication Data
US 2004/0264005 A1    Dec. 30, 2004

(30) Foreign Application Priority Data
Jun. 30, 2003    (JP)    ............... 2003-188053

(51) Int. Cl.
G02B 17/00    (2006.01)
G02B 27/10    (2006.01)

(52) U.S. Cl. ............ 359/729; 359/726; 359/627

(58) Field of Classification Search ........ 359/726–729, 359/627–631
See application file for complete search history.

(56) References Cited

U.S. PATENT DOCUMENTS 5,999,311  A    12/1999  Nanba et al.
6,409,352  B1    6/2002  Sunaga
6,556,360  B1 *  4/2003  Hoshi et al. ............... 359/727
2002/0163742 A1  11/2002  Togino

FOREIGN PATENT DOCUMENTS

| EP | 0 859 258 A2 | 8/1998 |
|---|---|---|
| JP | 08-292372 | 11/1996 |
| JP | 09-005650 | 1/1997 |
| JP | 09-222561 | 8/1997 |
| JP | 09-258105 | 10/1997 |
| JP | 09-258106 | 10/1997 |
| JP | 2000-231060 | 8/2000 |

* cited by examiner

Primary Examiner—Alicia M Harrington
(74) Attorney, Agent, or Firm—Morgan & Finnegan LLP (57) ABSTRACT A compact image-forming optical system is disclosed which has a high optical performance due to arranging a reflective optical unit and a refractive optical unit at suitable positions. The image-forming optical system is an optical system performing image formation from a magnifying side to a demagnifying side or from the demagnifying side to the magnifying side, and includes, in order from the magnifying side to the demagnifying side, a refractive optical unit having a positive optical power as a whole, and a reflective optical unit including at least three reflective surfaces. The image-forming optical system has a pupil on the magnifying side further from the reflective surface furthest on the magnifying side the reflective optical unit, and the focal length of the refractive optical unit is set to be within a range of 0.2 to 5 times the focal length of the reflective optical unit.

8 Claims, 8 Drawing Sheets

PRIOR ART

IMAGE-FORMING OPTICAL SYSTEM

BACKGROUND OF THE INVENTION

1. Field of the Invention

The present invention relates to an image-forming optical system, and particularly to an image-forming optical system including a refractive optical unit and a reflective optical unit.

2. Description of the Related Art

Image-forming optical systems forming an image of an object surface on a predetermined surface are used in optical apparatuses such as video cameras, still cameras, copying machines, projectors and exposure apparatuses.

Figure 8:
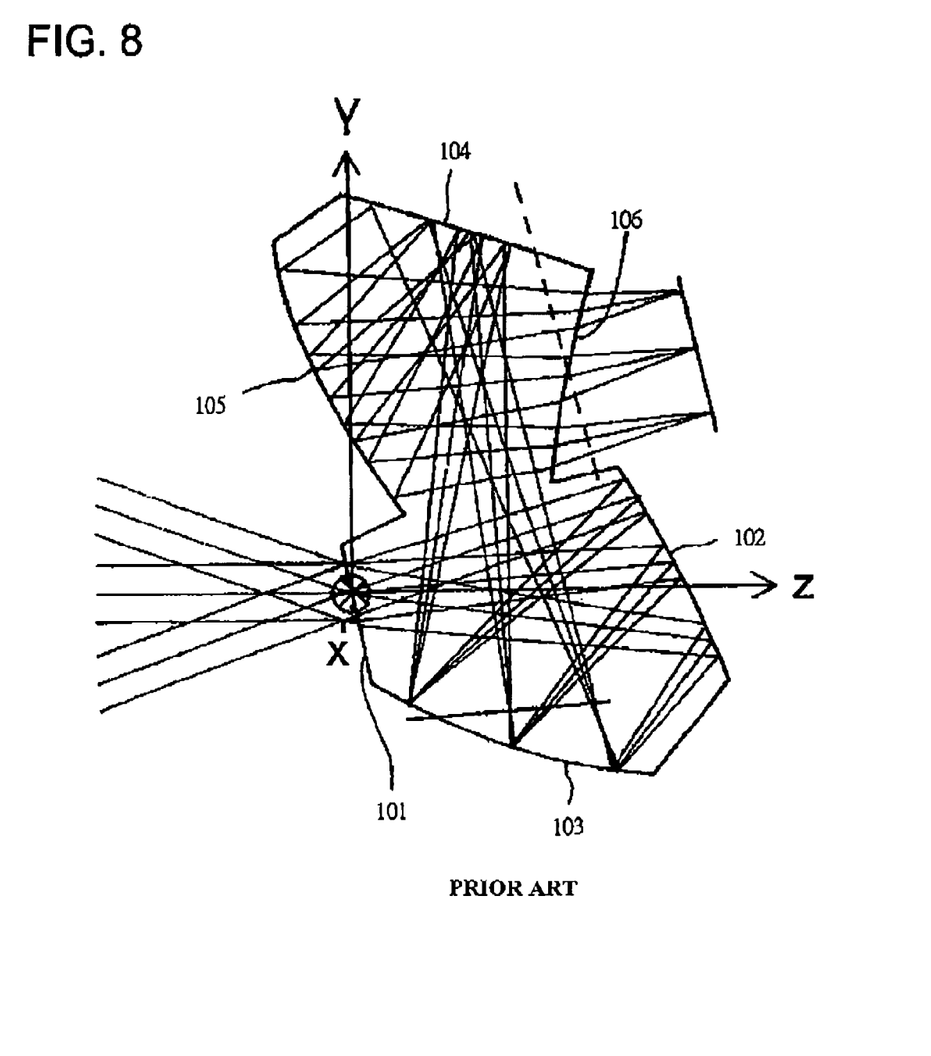
FIG. 8 is a cross-sectional view of a conventional image-forming optical system.

FIG. 8 shows an example of a reflective optical system as disclosed in Japanese Patent Application Laid Open No. 2000-231060. In this example, reflective surfaces 102 to 105 having a decentration are used, and an optical system with a compact structure is attained by letting the optical path cross within the optical system.

Ordinarily, it is possible to suppress chromatic aberration by using the reflective surfaces, so that by using a reflective optical system which is a non-coaxial optical system for projectors or image-scanning optical systems of copying machines, in which chromatic aberrations are problematic, it is possible to a realize an optical system with better performance than in the case of using a coaxial optical system.

Such a non-coaxial optical system is also referred to as an off-axial optical system. The off-axial optical system is defined as, when the path which a light ray passing through the center of an image and the center of a pupil is taken as the reference axis, an optical system including curved surfaces (off-axial curved surfaces) whose surface normals on the intersection between the surface and the reference axis do not coincide with the reference axis. In this case, the reference axis has a bent shape.

The constituent surfaces of such an off-axial optical system are ordinarily non-coaxial, and it is easy to construct the optical system using reflective surfaces, since no eclipse occurs at the reflective surfaces. Moreover, by forming an intermediate image within the optical system, it is possible to configure a compact optical system while ensuring a broad field angle.

Japanese Patent Application Laid Open No. H08 (1996)-292372, Japanese Patent Application Laid Open No. H09 (1997)-222561, and Japanese Patent Application Laid Open No. H09 (1997)-258105 disclose zoom optical systems using an off-axial optical system, and Japanese Patent Application Laid Open No. H09 (1997)-5650 discloses a method for designing a zoom optical system.

Moreover, optical systems combining refractive lenses and refractive surfaces have been proposed (see for example Japanese Patent Application Laid Open No. H09 (1997)-258106), but the object of most of these is to correct chromatic aberration.

In the optical system disclosed in FIG. 8, all of the reflective surfaces 102 to 105 are provided with a positive optical power in order to let the optical path intersect within the optical system and to make it compact. Furthermore, an incident surface 101 and an emergent surface 106 have a soft curvature and are substantially planar in order to suppress chromatic aberration. In order to suppress chromatic aberration, it is preferable that the incident and the emergent surfaces 101 and 106 have a negative optical power. In the case of refractive lenses, the Petzval's terms have the same sign as the optical power, whereas in the case of reflective surfaces, the Petzval's terms have the opposite sign of the optical power.

In the optical system of FIG. 8, if the influence of the incident and the emergent surfaces is disregarded, the Petzval's terms are all negative, so that a curvature of field occurs at the image surface, and a high optical performance cannot be attained. Moreover, if the optical system has reflective surfaces with a negative optical power, then the light flux diverges at these surfaces, so that the optical system becomes large. Due to this reason, it is desirable that the number of surfaces having negative optical power is reduced, when the goal is to make the optical system more compact.

However, in order to make the Petzval's sum zero, reflective surfaces having positive and negative optical power are necessary. As noted above, for refractive lenses, the Petzval's terms have the same sign as the optical power, where as for reflective surfaces they have the opposite sign of the optical power, so that when combining reflective surfaces and refractive lenses, it is possible to reduce the number of surfaces having negative optical power, making it possible to correct the Petzval's sum.

SUMMARY OF THE INVENTION

It is an object of the present invention to provide a compact image-forming optical system having a high optical performance due to arranging a reflective optical unit and a refractive optical unit at suitable positions.

To achieve this and other objects, an image-forming optical system according to one aspect of the present invention is an optical system performing image formation from a magnifying side to a demagnifying side or from the demagnifying side to the magnifying side, and includes, in order from the magnifying side to the demagnifying side, a refractive optical unit having a positive optical power as a whole, and a reflective optical unit comprising at least three reflective surfaces, each of the at least three reflective surfaces having a curvature. The image-forming optical system has a pupil on the magnifying side of the reflective surface that is furthest on the magnifying side in the reflective optical unit, and satisfies the following conditions:

$$0.2 < |fL/fR| < 5$$

$$T1 > T2$$

where fL represents a focal length of the refractive optical unit and fR represents a focal length of the reflective optical unit, T1 represents a minimum distance between the reflective surfaces in the reflective optical unit, and T2 represents a distance from the pupil to the refractive surface that is furthest away from the pupil in the refractive optical unit.

An optical system according to another aspect of the present invention includes, in order from the magnifying side to the demagnifying side, a refractive optical unit having a positive optical power as a whole, and a reflective optical unit comprising at least three reflective surfaces, each of the at least three reflective surfaces having a curvature. The image-forming optical system has a pupil on the magnifying side further from the reflective surface that is furthest on the magnifying side in the reflective optical unit, and satisfies the following conditions:

$$0.2 < |fL/fR| < 5$$

$$T1 > T2$$

where fL represents a focal length of the refractive optical unit and fR represents a focal length of the reflective optical unit, T1 represents a minimum distance between the reflective surfaces in the reflective optical unit, and T2 represents a distance from the pupil to the refractive surface that is furthest away from the pupil in the refractive optical unit.

These and further objects and features of the image-forming optical system (and optical system) according to the present invention will become apparent from the following detailed description of preferred embodiments thereof taken in conjunction with the accompanying drawings.

DETAILED DESCRIPTION OF THE PREFERRED EMBODIMENTS

The following is a description of preferred embodiments of the present invention, with reference to the accompanying drawings.

First, before going into the description of the embodiments, the notation for structural aspects in the embodiments as well as some common points of the embodiments are explained.

Figure 7:
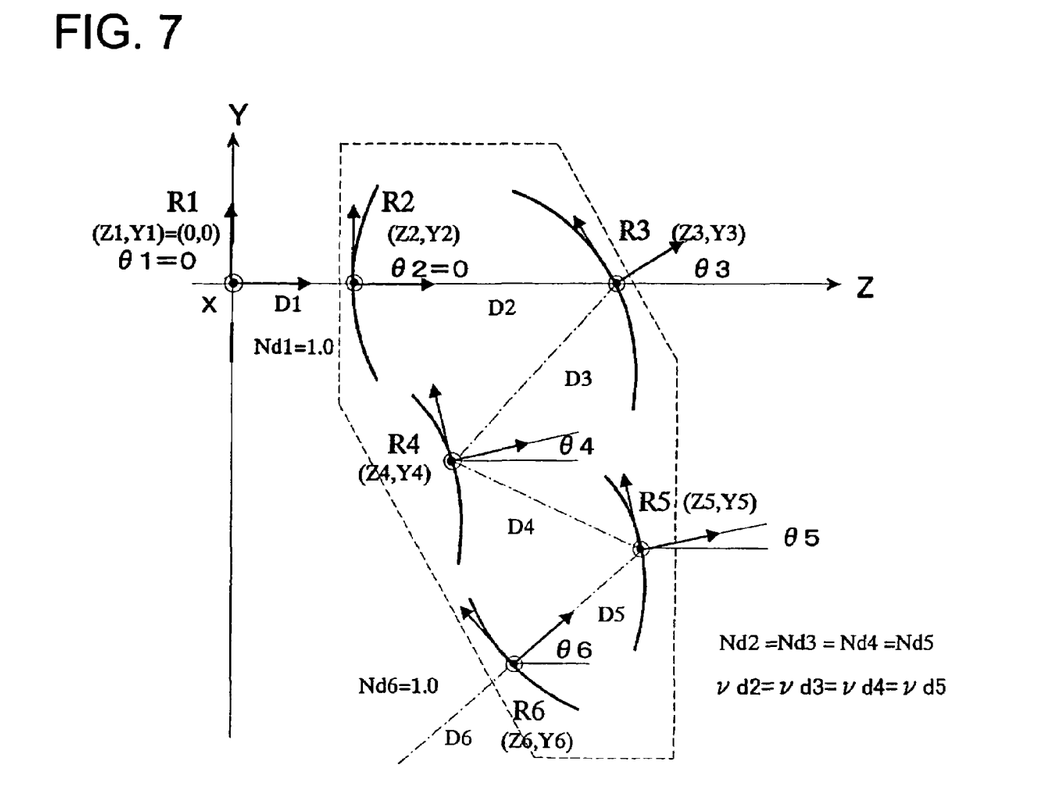
FIG. 7 illustrates the coordinates systems used in the embodiments.

FIG. 7 is a diagram of a coordinate system in which the structural data of the optical systems of the embodiments are defined. In the present embodiments, "i-th surface" means the i-th surface in the path of a light ray traveling from an object side to an image side (denoted by the dash-dotted line in FIG. 7 and referred to as "central principal ray" or "reference axis ray" in the following).

In FIG. 7, a first surface R1 is a stop, a second surface R2 is a refractive surface which is coaxial with a first surface R1, a third surface R3 is a reflective surface which is tilted with respect to the second surface R2, a fourth surface R4 and a fifth surface R5 are reflective surfaces which are both shifted and tilted with respect to the surface respectively preceding them, and a sixth surface R6 is a refractive surface which is shifted and tilted with respect to the fifth surface R5. The various surfaces from the second surface R2 to the sixth surface R6 are constituted on a single optical element, which is made of a medium such as glass or plastic.

Consequently, in the structure in FIG. 7, the medium from the object surface (not shown in the drawings) to the second surface R2 is air, there is a common medium from the second surface R2 to the sixth surface R6, and the medium from the sixth surface R6 to a seventh surface R7 (not shown in the drawings) is air. It should be noted that in the following embodiments, the optical surfaces are given as Si.

The optical systems of the embodiments are off-axial optical systems, which means that the various surfaces constituting the optical system do not have a common optical axis. Therefore, in the following embodiments, to facilitate explanations of the optical systems, a surface (reference surface) having an origin serving as a reference is introduced between the object surface and the reflective optical system. The following is an explanation of the arrangement of the surfaces with respect to the position of the origin.

In the present embodiments, a light ray traveling from a demagnifying side (for example, the side of an original image formed by a liquid crystal panel or the like in an image projection apparatus) toward a magnifying side (for example, an image surface side where a projection surface such as a screen is arranged in the image projection apparatus), or from the magnifying side (for example, an object side in an image-taking apparatus) toward the demagnifying side (for example, an image surface side where an image-pickup element such as a CCD sensor or the like is arranged in the image-taking apparatus), and from the center of an object surface (not shown in the drawings) through the center of a pupil (stop) to the center of a final image-forming surface is referred to as a "central principal ray" or "reference axis ray" (indicated by a dash-dotted line in FIG. 7). The path traveled by this ray is called the "reference axis." This reference axis is directional. The direction of the reference axis is the direction in which the central principal ray or reference axis ray travels during image formation. Moreover, the origin is the position of the central principal ray (reference axis ray) on the reference surface, and the normal on the reference surface coincides with the central principal ray (reference axis ray).

Moreover, in the following embodiments, the path over which the ray passing through the center of the effective diameter region of the stop surface and reaching the final image-forming surface (i.e. the central principal ray or reference axis ray) is refracted and reflected by the refractive surfaces and reflective surfaces is defined as the reference axis. The order of the surfaces is defined in the order in which the central principal ray is refracted and reflected. Therefore, the reference axis changes its direction in accordance with the rules for refraction or reflection along the various surfaces in the set order, and finally reaches the center of the image surface.

It should be noted that in the following embodiments, the reference axis serving as the reference for the optical system is set as described above, but when choosing the axis serving as the reference of the optical system, one should choose an axis which is appropriate with regard to the optical design, to account for aberrations and express the surface shapes constituting the optical system. Typically, however, the path of a light ray passing through the center of the image surface and the center of the stop or the entrance pupil or the exit pupil or the first surface of the optical system, or the center of the final surface is set as the reference axis serving as the reference of the optical system.

The tilted surfaces constituting the optical systems of the following embodiments are basically all tilted within the same plane. The various axes of the absolute coordinate system are defined as follows.

Z axis: A straight line passing through the origin and the center of the object surface. The direction from the object surface to the first surface R1 is defined as positive.

Y axis: A straight line passing through the origin and forming an angle of 90° counterclockwise with the Z axis, within the tilting plane (the paper plane of FIG. 7).

X axis: A straight line passing through the origin and perpendicular to the Z axis and the Y axis (a straight line perpendicular to the paper plane of FIG. 7).

Moreover, to express the surface shape of the i-th surface of the optical system, a local coordinate system is defined by taking the point at which the reference axis intersects with the i-th surface as the origin. Expressing the shape of the surface in the local coordinate system makes this shape more intuitive than describing the shape of that surface in the absolute coordinate system. For this reason, in the numerical examples of the structural data of the following embodiments, the surface shape of the i-th surface is expressed by a local coordinate system.

Moreover, the tilt angle of the i-th surface in the YZ plane is represented by an angle θi (in degrees) taking the counterclockwise direction with respect to the Z axis of the absolute coordinate system as positive. Thus, in the following embodiments, the origin of the local coordinate system at each surface is on the YZ plane in FIG. 7. Moreover, there is no decentration of the surfaces in the XZ and the XY plane. Furthermore, the y and z axes of the local coordinate system (x, y, z) of the i-th surface are inclined by an angle θi in the YZ plane with respect to the absolute coordinate system (X, Y, Z). More specifically, they are set as follows.

z axis: A straight line through the origin of the local coordinate system and forming an angle θi in a counterclockwise direction in the YZ plane with respect to the Z direction of the absolute coordinate system.

y axis: A straight line through the origin of the local coordinate system, and forming an angle of 90° in a counterclockwise in the YZ plane with respect to the z axis.

x axis: A straight line through the origin of the local coordinate system and perpendicular to the YZ plane.

Moreover, in the following embodiments, the numerical data for the structural surfaces are given as numerical examples. Herein, Di represents a scalar quantity expressing the distance between the origins of the local coordinate systems of the i-th surface and the (i+1)th surface, and Ndi and νdi represent, respectively, the refractive index and the Abbe's number of the medium between the i-th surface and the (i+1)th surface. Furthermore, E-X is shorthand for ×10$^{-x}$.

Here, the shape of spherical surfaces is expressed by the following equation:

$$z = \frac{(x^2 + y^2)/Ri}{1 + \{1 - (x^2 + y^2)/Ri^2\}^{1/2}} \quad (1)$$

Moreover, the optical systems of the following embodiments have at least one aspheric surface, which is rotationally asymmetric, and whose shape can be expressed by the following equation:

$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 C60x^6$

This curved surface equation includes only even terms for x, so that the curved surface given by this curved surface equation is plane symmetric with respect to the yz plane as the symmetry plane.

Moreover, if the following condition is satisfied, then the above equation expresses a shape which is symmetric with respect to the xz plane:

$C03 = C21 = C05 = C23 = C41 = t = 0$.

Moreover, if $C02 = C20$ $C04 = C40 = C22/2$ and $C06 = C60 = C24/3 = C42/3$ are satisfied, then the above equation expresses a rotationally symmetric shape. If these conditions are not satisfied, then it expresses a rotationally asymmetric shape.

It should be noted that in the following embodiments, vertical field angle (vertical half field angle uY×2) means the maximum field angle of the light flux incident on the first surface R1 in the YZ plane in FIG. 7, whereas the horizontal field angle (horizontal half field angle uX×2) means the maximum field angle of the light flux incident on the first surface R1 in the YZ plane. Moreover, the aperture diameter of the stop is shown as the stop diameter. This is related to the brightness of the optical system.

Moreover, transverse aberration charts are given for each of the numerical examples. These transverse aberration charts show the transverse aberration of light flux of an incident angle at which the horizontal incident angle and the vertical incident angle on the first surface R1 become (0, uY), (0, 0), (0, −uY), (uX, uY), (uX, 0), and (uX, −uY). Moreover, in these transverse aberration charts, the lateral axis marks the incident height on the pupil, and the vertical axis denotes the aberration amount.

In each of the numerical examples, the basic surfaces have a shape which is plane-symmetric with the yz plane as the symmetry plane, so that also in the aberration charts, the aberrations in the positive and negative directions of the vertical field angle are identical. Consequently, in order to make the drawings simpler, the transverse aberration charts for the negative direction have been omitted. Moreover, the evaluation wavelength is 550 nm.

Embodiment 1

Figure 1:
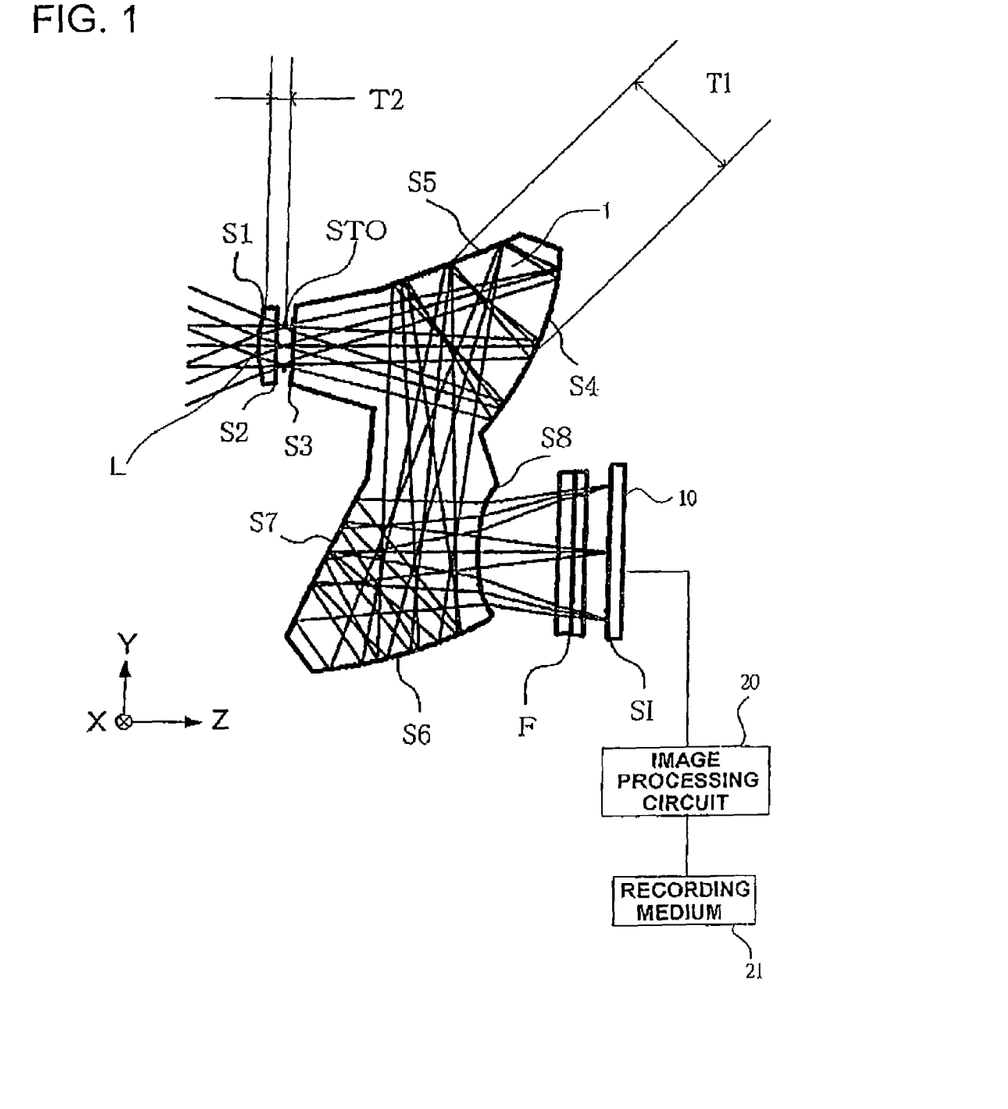
FIG. 1 is a cross-sectional view of an image-taking apparatus comprising an image-taking optical system according to Embodiment 1 of the present invention.

FIG. 1 is a cross-sectional view illustrating an image-taking apparatus or image-scanning apparatus including an image-taking optical system (image-forming optical system) according to Embodiment 1 of the present invention, taken in the YZ plane. A light flux from an object (image-taking object or original document) not shown in the drawing passes through a single lens (refractive optical unit) L having a positive optical power. The diameter of the light flux is limited by a stop STO, and the light flux is incident from an incident surface S3 on a reflective optical unit 1 formed as an integrated optical element.

The light flux incident on the reflective optical unit 1 is reflected in order by a concave reflective surface S4, a convex reflective surface S5, a concave reflective surface S6, and a concave reflective surface S7, and emerges from the reflective optical unit 1 through the emergent surface S8. Then it passes through a filter F constituted by a low-pass filter and an infrared-cut filter, and finally forms an image on an image surface SI. A light-receiving surface of a photoelectric conversion element (image-pickup element) 10 of a CCD sensor or a CMOS sensor or the like is arranged on the image surface SI.

The photoelectric conversion element 10 is connected to an image processing circuit 20. The object image is photoelectrically converted with the photoelectric conversion element 10, and its output signal undergoes various processes by the image processing circuit 20, and is turned into an image signal representing the object image. Then, the image signal is recorded on a recording medium, such as a semiconductor memory, a magnetic disk, an optical disk (in the case of an image-taking apparatus), or output to a computer connected to the apparatus or to a copy processing portion of a copying machine provided with the apparatus (in the case of an image-scanning apparatus).

The image-taking optical system of the present embodiment is an image-forming optical system forming images from a magnifying side to a demagnifying side, and includes in order from the magnifying side a single lens L having a positive optical power as a whole, and a reflective optical unit 1 including at least three (namely four in this embodiment) reflective surfaces S4 to S7 having a certain curvature. The image-taking optical system further has a pupil (stop STO) which is arranged on the magnifying side further from the reflective surface S4 which is furthest to the magnifying side in the reflective optical unit 1.

Figure 3:
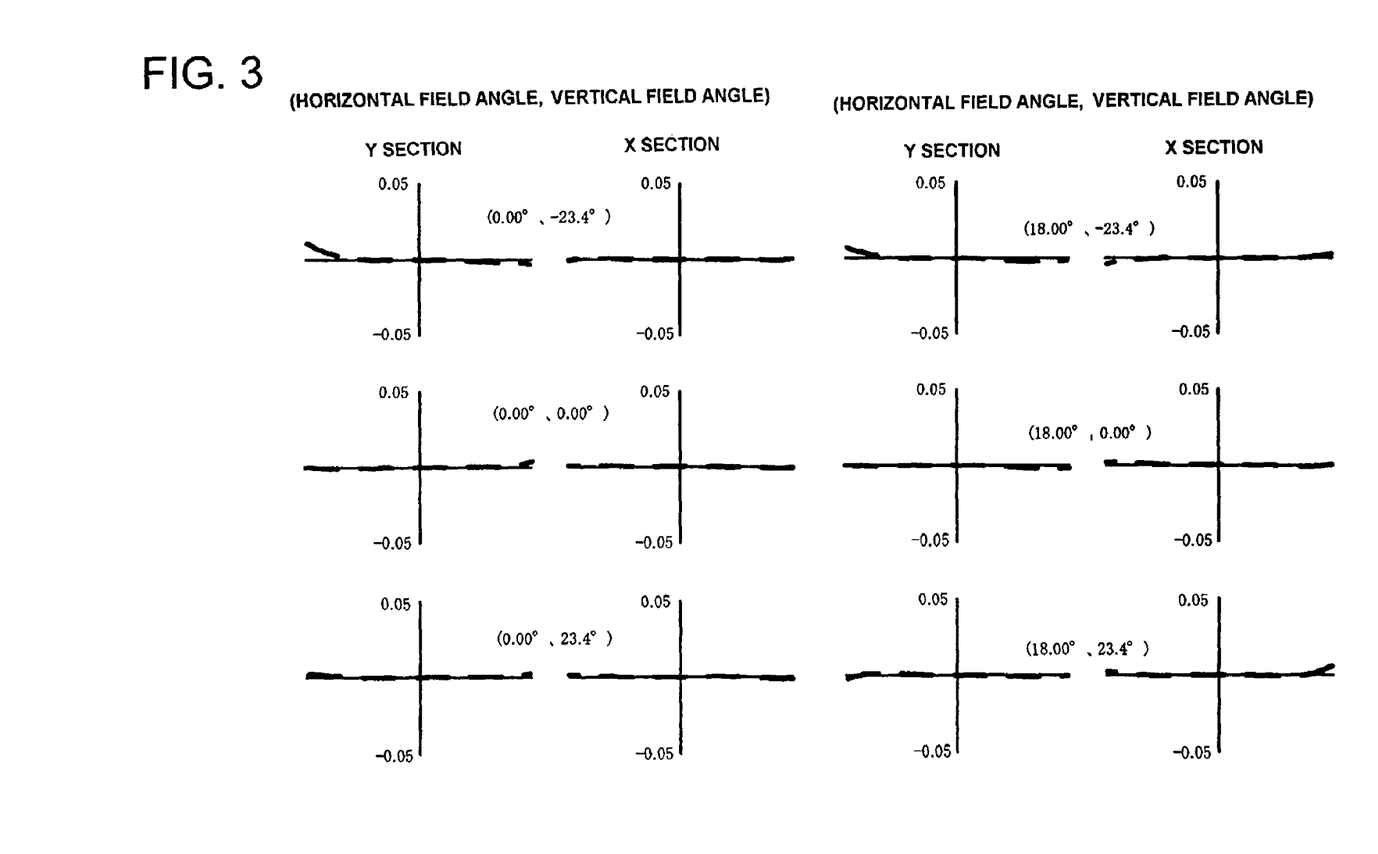
FIG. 3 shows transverse aberrational charts of Embodiment 1.

The following is a numerical example corresponding to the present embodiment. This numerical example illustrates an image-taking optical system with a horizontal field angle of 36° and a vertical field angle of 46.8°. FIG. 3 shows transverse aberration charts of this numerical example.

The structural data of this numerical example is as follows:

| | |
|---|---|
| vertical field angle | 46.8° |
| horizontal field angle | 36.0° |
| stop diameter | 1.2 mm |
| image-pickup element size | 4 × 3 mm | aspheric surface data

TABLE 1

| Si | Yi | Zi | θi | Di | Ndi | νdi |
|---|---|---|---|---|---|---|
| S1 | 0 | 0 | 0 | 0.5 | 1.49384 | 57.2 |
| S2 | 0 | 0.5 | 0 | 0.25 | 1 | |
| STOP | 0 | 0.75 | 0 | 0.25 | 1 | |
| S3 | 0 | 1 | 0 | 6.99 | 1.53199 | 55.8 |
| S4 | 0 | 7.99 | −22.06 | 3.55 | 1.53199 | 55.8 |
| S5 | 2.47 | 5.44 | −69.23 | 11.5 | 1.53199 | 55.8 |
| S6 | −9 | 4.57 | −72.35 | 3.79 | 1.53199 | 55.8 |
| S7 | −6.08 | 2.15 | −25.18 | 4.3 | 1.53199 | 55.8 |
| S8 | −6.08 | 6.45 | 0 | 2.27 | 1 | |
| FILTER | −6.08 | 8.73 | 0 | 0.45 | 1.49541 | 75 |
| FILTER | −6.08 | 9.18 | 0 | 0.3 | 1.51805 | 0 |
| FILTER | −6.08 | 9.48 | 0 | 0.7 | 1 | |
| IMAGE SURFACE | −6.08 | 10.18 | 0 | | | |

SPHERICAL SURFACE DATA

| | |
|---|---|
| S1 | r1 = 4.226 |
| S2 | r2 = 17.934 |

ASPHERICAL SURFACE DATA

| S3 | C02 = 2.42783E-02 | C20 = −1.50434E-02 | C03 = 2.70000E-02 |
|---|---|---|---|
| | C21 = −4.78818E-02 | C04 = −1.35750E-02 | C22 = −8.64771E-03 |
| | C40 = −6.01777E-03 | C05 = 8.67162E-03 | C23 = −1.00000E-02 |
| | C41 = −9.71302E-03 | C06 = −1.48061E-03 | C24 = 8.00000E-03 |
| | C42 = 2.17084E-03 | C60 = 3.84630E-03 | |
| S4 | C02 = −5.15623E-02 | C20 = −3.70002E-02 | C03 = −1.12867E-03 |
| | C21 = 1.56724E-03 | C04 = −3.78187E-04 | C22 = −6.37748E-04 |
| | C40 = −3.16843E-04 | C05 = −7.38121E-05 | C23 = −4.15396E-05 |
| | C41 = −8.20126E-05 | C06 = −2.01685E-05 | C24 = −4.42029E-05 |
| | C42 = 4.18444E-05 | C60 = 3.73220E-05 | |

TABLE 1-continued

| S5 | C02 = −3.08548E-03 | C20 = 2.83137E-02 | C03 = −3.15599E-03 |
|---|---|---|---|
| | C21 = −3.83709E-03 | C04 = −8.90784E-04 | C22 = −5.63495E-04 |
| | C40 = −5.82382E-04 | C05 = −2.67134E-04 | C23 = −3.08466E-04 |
| | C41 = −1.54443E-04 | C06 = −3.40479E-05 | C24 = −9.19919E-05 |
| | C42 = 1.54748E-04 | C60 = 8.38574E-05 | |
| S6 | C02 = −3.54728E-02 | C20 = −2.49591E-02 | C03 = −8.29517E-05 |
| | C21 = 1.91466E-03 | C04 = −3.96550E-05 | C22 = 6.26954E-05 |
| | C40 = 1.61364E-05 | C05 = −1.92829E-05 | C23 = −2.10038E-05 |
| | C41 = −1.05075E-04 | C06 = −4.46100E-06 | C24 = −1.78833E-05 |
| | C42 = −1.08925E-04 | C60 = −2.93622E-05 | |
| S7 | C02 = 3.39623E-03 | C20 = 3.30601E-02 | C03 = 8.28399E-04 |
| | C21 = 2.32454E-03 | C04 = 4.28327E-04 | C22 = 2.15908E-04 |
| | C40 = 1.88223E-04 | C05 = 5.88221E-06 | C23 = −8.12448E-05 |
| | C41 = −1.03836E-04 | C06 = −1.42901E-05 | C24 = −4.26490E-05 |
| | C42 = −6.36593E-05 | C60 = −1.60075E-05 | |
| S8 | C02 = 6.68610E-02 | C20 = 7.49181E-02 | C03 = −3.76518E-03 |
| | C21 = 2.85831E-02 | C04 = 1.30913E-02 | C22 = 1.72238E-02 |
| | C40 = 7.92092E-03 | C05 = −8.42969E-04 | C23 = −3.94234E-04 |
| | C41 = −1.65090E-03 | C06 = 1.17537E-03 | C24 = 1.33488E-03 |
| | C42 = −1.55289E-03 | C60 = −8.25368E-04 | |

Here, the Petzval's sum in the present embodiment (numerical example) is considered. The Petzval's term is given by 1/fNN'. Here, f represents the focal length of the optical surface, whereas N and N' respectively represent the refractive indices of the media before and after the optical surface. In the case of reflective surfaces, N' becomes −N, so that different from a refractive lens, the Petzval's term has the opposite sign as the focal length of the optical surface.

In order to make the Petzval's sum also for the optical system having reflective surfaces small, reflective surfaces having positive and negative focal length become necessary. However, when a reflective surface having a negative focal length is used, then the light flux widens, and the optical surface becomes large. That is to say, if the number of surfaces having a negative focal length is reduced, then it becomes possible to make the optical system more compact.

Figure 2:
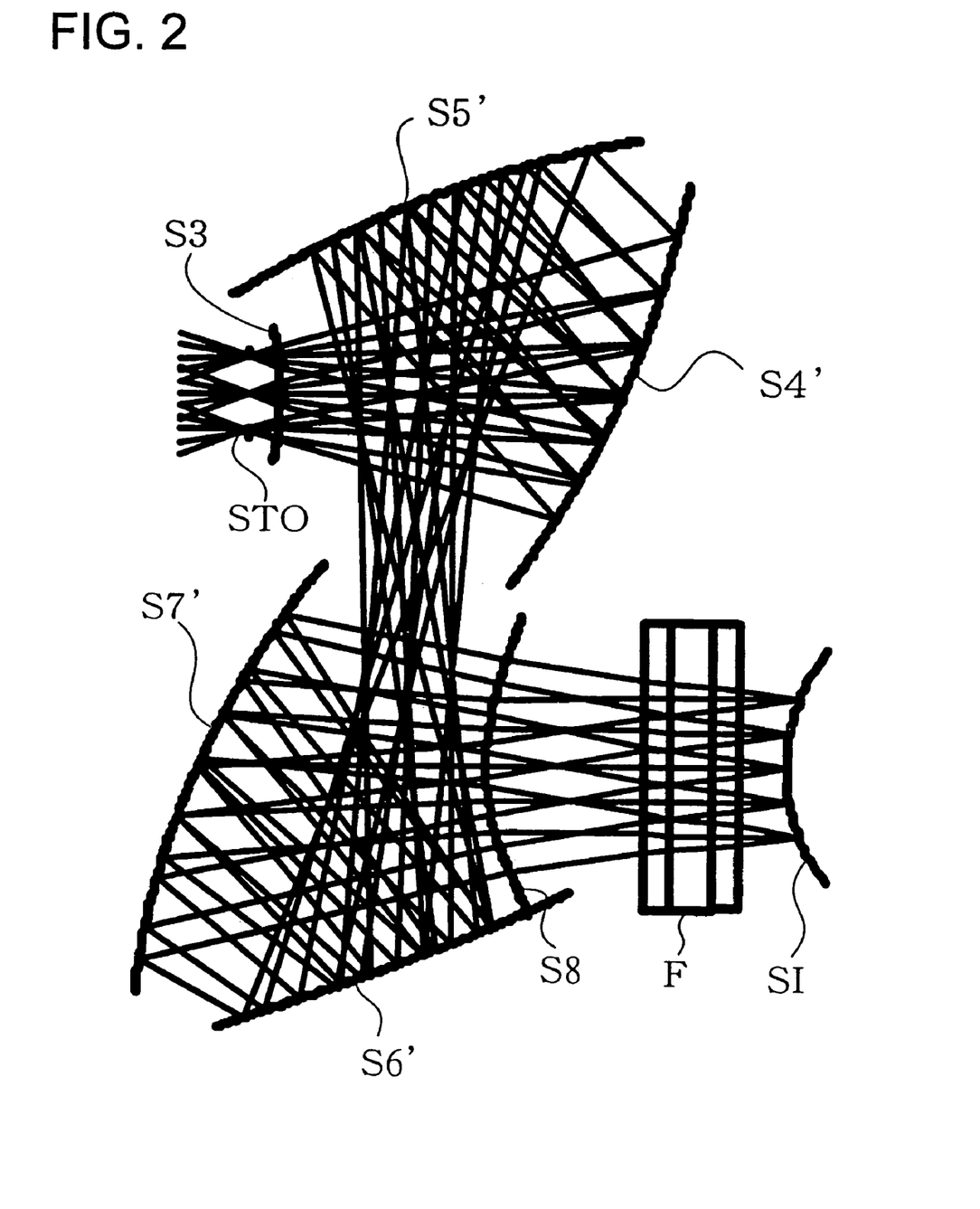
FIG. 2 is a cross-sectional view of an optical system, in which the image surface is curved.

FIG. 2 shows an example in which the image surface SI is designed to have a certain curvature. In this example, the focal length (namely, an optical power which is an inverse of the focal length) of each of the reflective surfaces S4' to S7' is positive, and it is possible to attain the necessary optical performance. However, a way to reduce this curvature of field, that is, a way to reduce the Petzval's sum should be found.

The Petzval's terms at the reflective surfaces and the refractive surfaces have opposite signs, so that if a lens (refractive optical unit) having a positive focal length (optical power) is added, then it becomes possible to correct the curvature of field without widening the light flux.

Moreover, in order to reduce the curvature, it is preferable that the focal length fL of the lens L is close to the focal length fR of the reflective surfaces. The focal length fL should be around 0.2 to 5 times the focal length fR of the reflective optical unit. That is, it should satisfy:

$$0.2 < fL/|fR| < 5 \qquad (1)$$

When the value of fL/|fR| is outside this range, then the effect of control of the Petzval's sum is lost. However, since the reflective surfaces are not spherical surfaces but are configured as free-curved surfaces (rotationally asymmetric surfaces), it is not necessary that the Petzval's sum is zero. Furthermore, when rotationally asymmetric surfaces are used, then there is also a rotationally asymmetric curvature of field. In order to cancel this curvature of field, it is preferable that at least one of the refractive surfaces of the added lens is a rotationally asymmetric surface.

Based on the above-described considerations, in the present embodiment, the lens L, which has a positive optical power, is added near the pupil (stop STO) on the magnifying side, at a position on the magnifying side further from the reflective optical unit 1 (i.e. further on the magnifying side than the reflection surface which is arranged furthest on the magnifying side), thus controlling the Petzval's sum.

In this numerical example, the focal length fL of the lens L and the focal length fR of the reflective optical unit 1 can be calculated to be:

fL=11.0609 mm fR=−5.46666 mm

It should be noted that these are the focal lengths for the azimuth in the YZ plane. Moreover, these values satisfy Conditional Expression (1).

Moreover, there are three reflective surfaces (S4, S6, S7) each having a positive optical power, and there is one reflective surface (S5) having a negative optical power. That is to say, the number of reflective surfaces having an optical power for focusing is lower than the number of reflective surfaces having a positive optical power. For this reason, it is possible to ensure that the light flux within the reflective optical unit 1 does not widen too much, and as a result, the size of the reflective surfaces can be reduced, so that the reflective optical unit 1 can be configured compactly.

Ordinarily, the focal length differs depending on the azimuth on which is focused, but what affects the size of the optical system most is the focal length within the plane where the reflective surfaces are arranged (within the plane including the reference axis), so that it becomes problematic whether the focal lengths within this plane are positive or negative.

Moreover, ordinarily, the size of the first reflective surface seen from the magnifying side tends to become large, but in the present embodiment, the diameter of the light flux incident on this first reflective surface can be made small, and the size of that reflective surface is reduced by arranging the positive lens L on the magnifying side further from the first reflective surface.

Moreover, the image-forming optical system of the present embodiment has a pupil (stop STO) on the magnifying side further from the reflective optical unit 1, and by arranging the single lens L near the position of this pupil, the size of the single lens L can be kept down while keeping down the curvature of field.

The reflective optical unit 1 should satisfy the following condition:

T1>T2    (2)

where T1 represents the minimum distance between the curved optical surfaces (reflective surfaces), and T2 represents the distance from the pupil on the magnifying side to the optical surface (refractive surface) of the single lens L furthest away from the pupil. If this Conditional Expression (2) is not satisfied, then the lens L becomes large, which stands in the way of making the image-forming optical system more compact.

In the foregoing numerical example, T1=3.55 (distance between the reflective surfaces S4 and S5), and T2=0.75 mm (distance between the refractive surface S1 and the stop STO), so that the Conditional Expression (2) is satisfied.

It should be noted that this embodiment has been explained for the case that the reflective optical unit 1 is provided with four reflective surfaces, but the present invention is not limited to four reflective surfaces. However, in order to display a high performance with the reflective surfaces, at least three reflective surfaces are necessary.

Moreover, the reflective surfaces have a shape which is symmetric with respect to a certain plane, but the present invention is not limited to this. That is to say, they may also have a shape that is asymmetric with respect to any planes.

Furthermore, this embodiment has been explained for an image-forming optical system in which a single lens is combined with one reflective optical element (reflective optical unit), but it is also possible to configure an image-forming (image-taking) optical system using a plurality of optical elements, which includes this structure on the magnifying side. For example, it is possible to configure a zooming optical system having a zooming optical unit and a compensator, which includes this structure in a fixed optical unit on the magnifying side, and in which the relative position among a plurality of optical elements is changed, as proposed in Japanese Patent Application Laid Open No. H08 (1996)-292372, Japanese Patent Application Laid Open No. H09 (1997)-222561, and Japanese Patent Application Laid Open No. H09 (1997)-258105.

Embodiment 2

Figure 4:
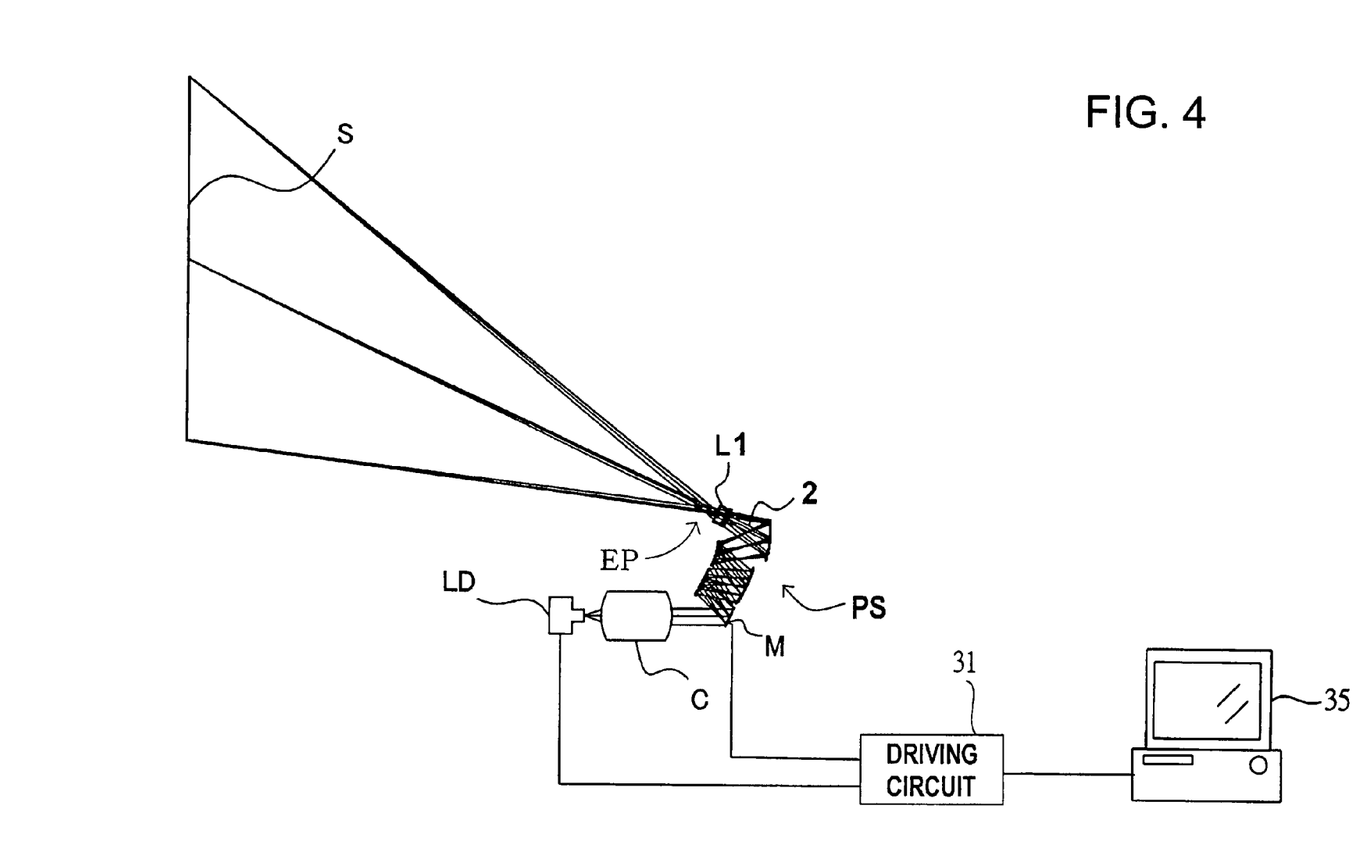
FIG. 4 is a cross-sectional view of an image projection apparatus comprising a projection optical system according to Embodiment 2 of the present invention.
Figure 5:
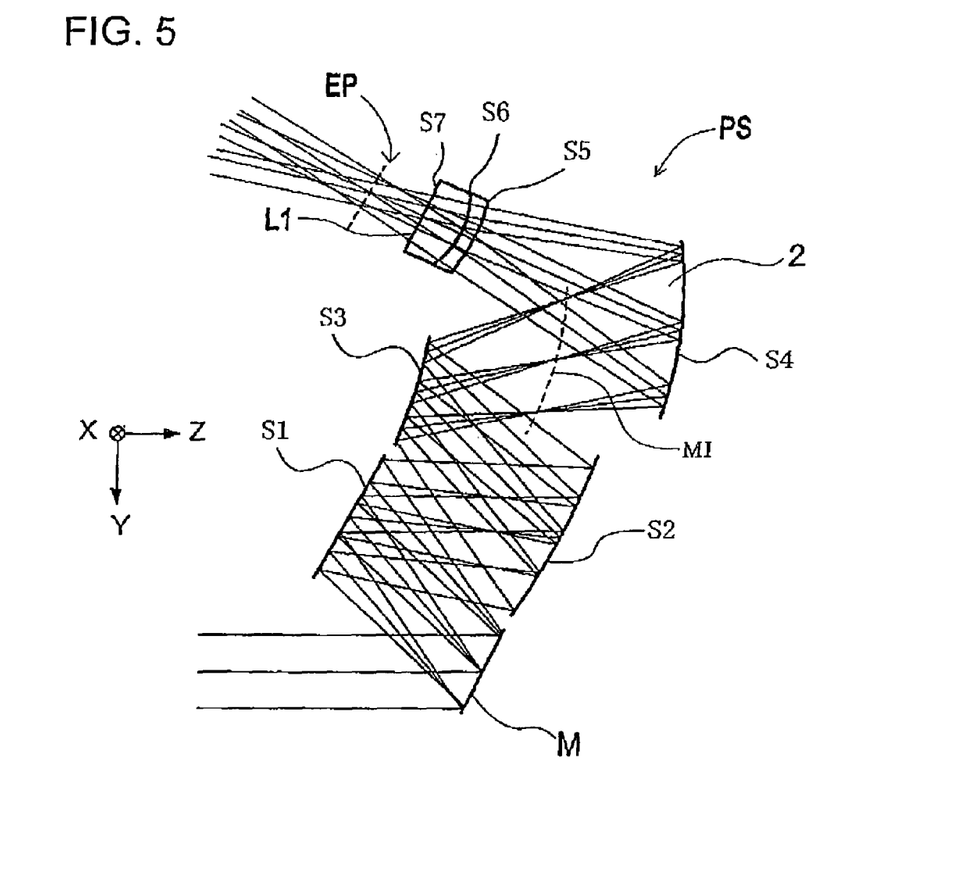
FIG. 5 is a cross-sectional view of a projection optical system according to Embodiment 2.

FIG. 4 shows the structure, within the YZ plane, of an image projection apparatus including a projection optical system (image-forming optical system) according to Embodiment 2 of the present invention. Moreover, FIG. 5 shows a magnified YZ cross section of this projection optical system.

A light flux from a laser light source LD is turned into a substantially parallel light flux by a collimator lens C, and is incident on a micro-mirror device M. The micro-mirror device M is configured by an MEMS (micro-electromechanical system), and the mirrors can be oscillated in two orthogonal directions by applying an electrical signal. Therefore, the light flux incident on the micro-mirror device can be scanned in two dimensions.

The laser light source LD and the micro-mirror device M are connected to a driving circuit 31 driving them, and the driver circuit 31 is connected to an image information supplying apparatus 35, such as a personal computer, a DVD player, a video recorder (VCR), a digital video recorder, a digital still camera, or an antenna/tuner unit receiving image information from electromagnetic waves. The driver circuit 31 receives image information from the image information supplying apparatus 35, drives the light emission and modulation of the laser light source LD in accordance with this image information, and drives the micro-mirror device M in synchronization therewith.

Then, the scanned light flux is incident on the projection optical system PS, is reflected in order by a concave reflective surface S1, a concave reflective surface S2, a convex reflective surface S3, and a concave reflective surface S4 of a reflective optical unit 2 constituting a portion of this projection optical system PS, and after passing through a cemented lens (refractive optical unit) L1 constituting a portion of the projection optical system PS, it forms an image on a screen S. Thus, an image is projected and displayed on the screen S.

The projection optical system PS of the present embodiment is an image-forming optical system forming images from a demagnifying side to a magnifying side, and includes, in order from the magnifying side, a cemented lens L1 having a positive optical power as a whole, a reflective optical unit 2 including at least three (namely four in this embodiment) reflective surfaces S4 to S7 having a certain curvature. Moreover, it includes a pupil EP (see FIG. 4) on the magnifying side further from the reflective surface S4, which is the reflective surface of the reflective optical unit 2 that is furthest on the magnifying side.

Figure 6:
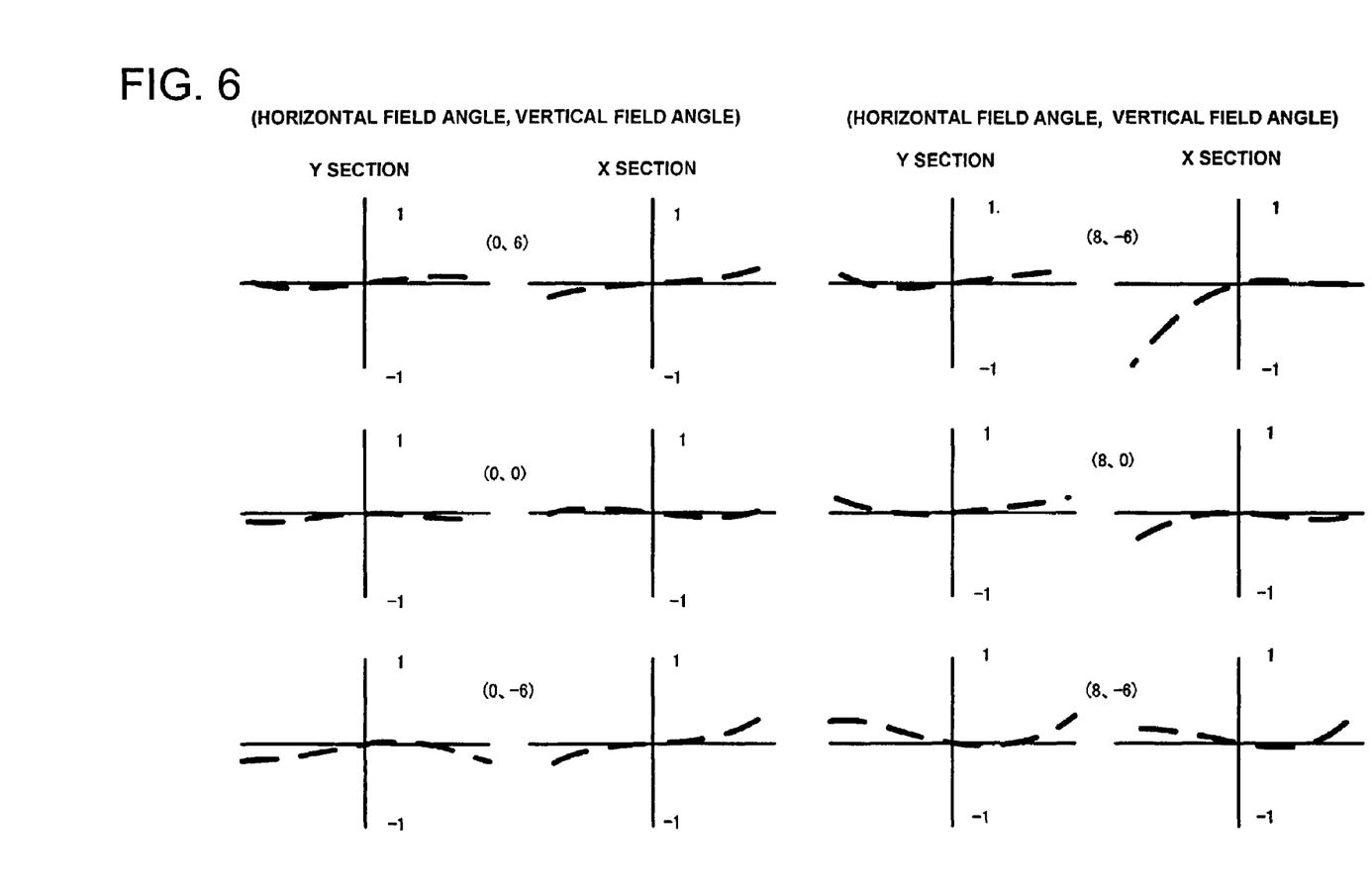
FIG. 6 shows transverse aberrational charts of Embodiment 2.

The following illustrates a numerical example corresponding to the present embodiment. This numerical example illustrates a projection optical system, in which the light flux is scanned ±8° in the horizontal direction and ±6° in the vertical direction (this angle corresponds to the field angle) by the micro-mirror device M, is transmitted through the cemented lens L1 on the magnifying side, and projected at an angle of 25° onto the screen S. FIG. 6 shows transverse aberration charts of this numerical example.

The structural data of this numerical example is as follows:

stop diameter (micro-mirror device M): 54 mm
screen size: 40 inches

TABLE 2

| Si | Yi | Zi | θi | Di | Ndi | vdi | |
|---|---|---|---|---|---|---|---|
| M | 0 | 0 | 25 | 75 | 1 | | STOP |
| S1 | −57.45 | −48.21 | 28 | 75 | 1 | | REFLECTIVE SURFACE |
| S2 | −49.61 | 26.38 | 26 | 75 | 1 | | REFLECTIVE SURFACE |
| S3 | −103.56 | −25.72 | 16 | 95.47 | 1 | | REFLECTIVE SURFACE |
| S4 | −126.66 | 66.92 | 5.5 | 80.89 | 1 | | REFLECTIVE SURFACE |
| S5 | −160.85 | −6.4 | 25 | 5 | 1.60288 | 38.75 | REFLACTIVE SURFACE |
| S6 | −162.96 | −10.93 | 25 | 15 | 1.54658 | 65.08 | REFLACTIVE SURFACE |
| S7 | −169.3 | −24.52 | 25 | 1000 | 1 | | REFLACTIVE SURFACE |
| IMAGE SURFACE | −591.92 | −930.83 | 0 | | 1 | | |

SPHERICAL SURFACE DATA

| S5 | r5 = −66.12 |
|---|---|
| S6 | r6 = −30.957 |
| S7 | r7 = −363.574 |

ASPHERICAL SURFACE DATA

| S1 | $C02 = 1.55082E-04$ | $C20 = 3.90504E-05$ | $C03 = -7.24224E-06$ |
|---|---|---|---|
| | $C21 = -9.88121E-06$ | $C04 = -2.44062E-08$ | $C22 = -5.92628E-08$ |
| | $C40 = -1.80440E-08$ | $C05 = 1.99666E-10$ | $C23 = 2.92804E-10$ |
| | $C41 = 2.79107E-10$ | $C06 = 5.63095E-12$ | $C24 = 4.20114E-11$ |
| | $C42 = 1.10450E-11$ | $C60 = 3.02916E-12$ | |
| S2 | $C02 = -2.07182E-03$ | $C20 = -2.61367E-03$ | $C03 = -5.54803E-06$ |
| | $C21 = -7.60237E-06$ | $C04 = 2.41380E-08$ | $C22 = 1.67037E-08$ |
| | $C40 = -4.65048E-09$ | $C05 = -3.35957E-11$ | $C23 = -2.51561E-10$ |
| | $C41 = -7.25179E-11$ | $C06 = 1.63778E-12$ | $C24 = 1.84722E-11$ |
| | $C42 = 3.60805E-12$ | $C60 = 9.85044E-13$ | |
| S3 | $C02 = -2.96538E-03$ | $C20 = -5.80161E-03$ | $C03 = 4.67750E-06$ |
| | $C21 = -8.21970E-06$ | $C04 = 3.70787E-07$ | $C22 = 7.28395E-07$ |
| | $C40 = 3.64190E-07$ | $C05 = 6.87575E-10$ | $C23 = 6.57040E-09$ |
| | $C41 = 6.13441E-09$ | $C06 = -5.38087E-11$ | $C24 = 3.03171E-10$ |
| | $C42 = 1.38329E-10$ | $C60 = 7.69115E-11$ | |
| S4 | $C02 = -3.37805E-03$ | $C20 = -3.84801E-03$ | $C03 = 4.99229E-06$ |

TABLE 2-continued

| | | |
|---|---|---|
| $C21 = 6.09094E-06$ | $C04 = 1.02553E-08$ | $C22 = 5.78282E-09$ |
| $C40 = 2.62364E-08$ | $C05 = -6.57463E-11$ | $C23 = -1.70784E-10$ |
| $C41 = -1.49720E-10$ | $C06 = -5.71254E-12$ | $C24 = -2.66572E-12$ |
| $C42 = -4.61469E-12$ | $C60 = -4.55804E-12$ | |

In this numerical example, the focal length fL of the cemented lens L1 and the focal length the reflective optical unit 2 can be calculated to be:

fL=166.733 mm fR=−519.073

It should be noted that these are the focal lengths for the azimuth in the YZ plane.

Moreover, these values satisfy Conditional Expression (2). Since the focal length of the lens L1 is at least 0.2 and at most 5 times the focal length of the reflective optical unit 2, the Petzval's sum is controlled, and it is possible to achieve a high optical performance.

Furthermore, in this embodiment, there are three reflective surfaces (S1, S2, S4) each having a positive optical power, and there is one reflective surface (S3) having a negative optical power. Thus, the light flux within the reflective optical unit 2 does not widen too much, so that the reflective optical unit 2 can be configured compactly.

Ordinarily, the focal length differs depending on the azimuth on which is focused, but what effects the size of the optical system mostly is the focal length within the plane where the reflective surfaces are arranged (within the plane including the reference axis), so that it becomes problematic whether the focal lengths within this plane are positive or negative.

Moreover, ordinarily, the size of the first reflective surface seen from the magnifying side tends to become large, but in the present embodiment, the diameter of the light flux incident on this first reflective surface can be made small, and the size of that reflective surface is reduced by arranging the positive cemented lens L1 on the magnifying side further from the first reflective surface.

Moreover, in FIG. 5, MI denotes an intermediate image formation position, and the reflective surface S4 can be made even smaller by forming an intermediate image between the reflective surfaces S3 and S4.

Moreover, the projection optical system of this embodiment has the pupil EP on the magnifying side further from the reflective optical unit 2, and by arranging the cemented lens L1 near the position of this pupil EP, the size of the cemented lens L1 can be kept down while keeping down the curvature of field.

More specifically, when T1 represents the minimum distance between the optical surfaces (reflective surfaces) having a certain curvature in the reflective optical unit 2, and T2 represents the distance from the pupil on the magnifying side to the surface of the cemented lens L1 that is furthest on the magnifying side, then, in the above-described numerical example, T1=75 mm (distance between the reflective surfaces S1 and S2 and between the reflective surfaces S2 and S3), and T2=32.5 mm (distance between the refractive surface S7 and the pupil EP), so that the Conditional Expression (2) is satisfied.

It should be noted that this embodiment has been explained for the case that the reflective optical unit 2 is provided with four reflective surfaces, but the present invention is not limited to four reflective surfaces. However, in order to display a high performance with the reflective surfaces, at least three reflective surfaces are necessary.

Moreover, the reflective surfaces have a shape which is symmetric with respect to a certain plane, but the present invention is not limited to this. That is to say, they may also have a shape which is asymmetric with respect to any planes.

Moreover, this embodiment has been explained for the case that a cemented lens L1 is used, but it is also possible to use a lens unit other than a cemented lens (such as a single lens or a plurality of lenses) as the refractive optical unit. Moreover, this embodiment has been explained for the case that all refractive surfaces of the cemented lens L1 are rotationally symmetric, but it is also possible to provide at least one surface with a rotationally asymmetric shape.

Furthermore, this embodiment has been explained for an image-forming optical unit in which a cemented lens is combined with one reflective optical element (reflective optical unit), but it is also possible to configure a projection optical system using a plurality of optical elements, and including this structure on the magnifying side. For example, it is possible to configure a zooming optical system having a zooming optical unit and a compensator, which includes this structure in a fixed optical unit on the magnifying side, and in which the relative position among a plurality of optical elements is changed, as proposed in Japanese Patent Application Laid Open No. H08 (1996)-292372, Japanese Patent Application Laid Open No. H09 (1997)-222561, and Japanese Patent Application Laid Open No. H09 (1997)-258105.

Moreover, this embodiment has been explained for an image projection apparatus using a laser light source and a micro-mirror device, but instead of them, it is also possible to use a liquid crystal display panel and an illumination light source or a self-light emitting element.

Furthermore, as proposed in Japanese Patent Application Laid Open No. H08 (1996)-292372, Japanese Patent Application Laid Open No. H09 (1997)-222561, and Japanese Patent Application Laid Open No. H09 (1997)-258105, it is also possible to configure a zooming optical system by changing the relative position among a plurality of optical elements.

Moreover, the image-forming optical system of the present invention may be applied not only to an image-taking optical system or a projection optical system as explained in the above embodiments, but also to an exposure optical system of a semiconductor exposure apparatus.

As explained in the foregoing, with the above-described embodiments, even when a reflective optical unit has a small number of optical surfaces having a negative optical power, it is possible to keep down the curvature of field and to miniaturize the refractive optical unit, that is, to achieve miniaturization of the image-forming optical unit, by adding a refractive optical unit having a positive optical power near a position of a pupil on the magnifying side. Furthermore, by setting the focal length of the refractive optical unit to within a range of 0.2 to 5 times the focal length of the reflective optical unit, it is possible to control the Petzval's sum and to realize a superior optical performance.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image-forming optical system comprising in order from the magnifying side to the demagnifying side:
    a refractive optical element having a positive optical power as a whole; and
    a reflective optical unit comprising at least three reflective surfaces, each of the at least three reflective surfaces having a curvature;
    wherein the refractive optical element is separated from the reflective optical unit and is disposed further on the magnifying side than a final reflective surface of the reflective optical unit,
    the image-forming optical system has a pupil on the magnifying side of the reflective surface furthest on the magnifying side in the reflective optical unit, and satisfies the following conditions:

$T1 > T2$ where T1 represents a minimum distance on a reference axis ray between the reflective surfaces in the reflective optical unit, and T2 represents a distance on the reference axis ray from the pupil to the refractive surface furthest away from the pupil in the refractive optical element, the reference axis ray is a ray through a center of the pupil to a center of a final image-forming surface.

2. The image-forming optical system according to claim 1, wherein, in the reflective optical unit, the number of reflective surfaces having a positive optical power is larger than the number of reflective surfaces having a negative optical power.

3. The image-forming optical system according to claim 1, wherein, the refractive optical element is made of rotationally symmetric refractive surface.

4. The image-forming optical system according to claim 1, wherein the refractive optical element comprises at least one rotationally asymmetric refractive surface.

5. An optical apparatus comprising an image-forming optical system according to claim 1.

6. An image-taking apparatus comprising:
    the image-forming optical system according to claim 1; and
    a photoelectric conversion element, which photoelectrically converts an object image formed by the image-forming optical system.

7. An image-scanning apparatus comprising:
    the image-forming optical system according to claim 1; and
    a photoelectric conversion element, which photoelectrically converts an original document image formed by the image-forming optical system.

8. An image projection apparatus comprising:
    an image-generating unit generating an original image; and
    an image-forming optical system according to claim 1 projecting light from the original image formed by the image-generating unit.

* * * * *